(12) United States Patent
Boday et al.

(10) Patent No.: US 9,884,940 B2
(45) Date of Patent: Feb. 6, 2018

(54) POLYTHIOAMINALS WITH TUNABLE MODULUS

(71) Applicant: International Business Machines Corporation, Armonk, NY (US)

(72) Inventors: Dylan J. Boday, Austin, TX (US); Jeannette M. Garcia, San Leandro, CA (US); James L. Hedrick, Pleasanton, CA (US); Rudy J. Wojtecki, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/153,079

(22) Filed: May 12, 2016

(65) Prior Publication Data
US 2017/0327645 A1 Nov. 16, 2017

(51) Int. Cl.
*C08F 297/04* (2006.01)
*C08G 75/04* (2016.01)
*C08K 3/38* (2006.01)

(52) U.S. Cl.
CPC ............... *C08G 75/04* (2013.01); *C08K 3/38* (2013.01); *C08K 2003/387* (2013.01)

(58) Field of Classification Search
CPC .................. H01L 51/0067; H01L 51/0072
USPC ................................... 528/53, 186
See application file for complete search history.

(56) References Cited

U.S. PATENT DOCUMENTS

| | | | |
|---|---|---|---|
| 4,716,085 A | 12/1987 | Biale | |
| 5,165,479 A | 11/1992 | Harris et al. | |
| 5,372,732 A | 12/1994 | Harris et al. | |
| 8,603,236 B2 | 12/2013 | Cordova | |
| 9,090,812 B2 | 7/2015 | Gerrard et al. | |
| 2017/0049902 A1* | 2/2017 | Hedrick | A61K 47/48215 |

FOREIGN PATENT DOCUMENTS

| | | |
|---|---|---|
| JP | 2007226222 A | 9/2007 |
| WO | WO 9512632 | 5/1995 |
| WO | WO 2014169044 A1 | 10/2014 |

* cited by examiner

*Primary Examiner* — Shane Fang
(74) *Attorney, Agent, or Firm* — Patterson + Sheridan, LLP

(57) ABSTRACT

Compounds include boronate ester polythioaminals with substituents that include hydrogen, fluorine or substituted or unsubstituted alkyls. The boronate ester polythioaminals have number average molecular weight or weight average molecular weight between about 2,000 to about 160,000.

20 Claims, No Drawings

POLYTHIOAMINALS WITH TUNABLE MODULUS

FIELD

The present disclosure relates to polythioaminals and synthesis of polythioaminals.

BACKGROUND

Polythioaminals are a class of polymers with a variety of uses, including drug delivery. Some polythioaminals are polymers that have the general structure:

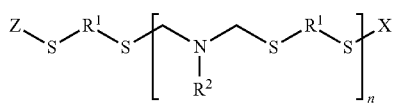

where $R^1$ and $R^2$ are organic or hetero-organic species. It has been shown that polythioaminals having the above structure may be synthesized by reacting an N-substituted hexahydrotriazine with a dithiol, as follows:

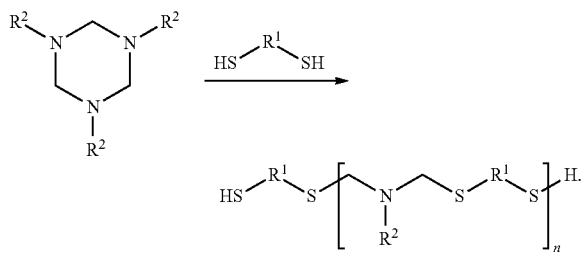

Subsequent reactions may replace the hydrogen atoms at the end of the thioaminal polymer with the X and Z groups above. These polymers feature dynamic covalent bonding, undergoing reversible bond breakage and reformation. The dynamic covalent character of these polymers is chemosensitive, and may be triggered by the presence of thiols.

One method to tune the physical and/or mechanical properties of these polymers is to increase the molecular weight of the polymers. Whether a polythioaminal can achieve a high molecular weight during polymerization is affected by stoichiometric ratios of starting materials, as described by the Carothers equation. The Carothers equation states that the degree of polymerization of a monomer (into a polymer) is equal to $1/(1-p)$, where p is the extent of conversion of a monomer. If one monomer is present in stoichiometric excess, then the equation becomes $(1+r)/(1+r-2rp)$, where r is the stoichiometric ratio of reactants, the excess reactant is conventionally the denominator so that r<1. If neither monomer is in excess, then r=1 and the equation reduces to the equimolar case above. Small changes in the stoichiometry of one of the polymerization reactants may significantly affect the molecular weight of a synthesized polymer. Molecular weight of polythioaminals is also limited by a byproduct amine formed during polythioaminal formation. Each carbon atom of a hexahydrotriazine is electrophilic and reacts with the nucleophilic thiols (such as the dithiol shown in the scheme above). As such, this reaction yields the primary amine byproduct. If this primary amine byproduct is not efficiently removed, formation of high molecular weight polythioaminals is very limited. Nonetheless, linear polythioaminals typically do not exhibit attractive physical properties, e.g. they are viscous liquids.

Physical and mechanical properties of polythioaminals may also be tuned by polymerizing multiple polymers from a core compound using multi-functional thiols (at the polymer termini shown above) that may enhance the rigidity (modulus) and dimensional stability (under stress). However, the use of multi-functional thiols reduces the molecular weight of the linear polythioaminals as the crosslink density is increased. These lower molecular weight polythioaminals are typically mechanically weak.

If, however, crosslinking moieties could be included along a polythioaminal backbone without reducing the molecular weight of the polythioaminals, one could more readily achieve tailorable mechanical properties of polythioaminals (such as a desirable modulus for certain applications) and may provide access to elastomeric materials.

Therefore, there is a need in the art for new polythioaminals with improved and tailorable physical and mechanical properties.

SUMMARY

In some embodiments, a material comprises a compound from the group consisting of formulas (I), (II), (III), (IV), and salts thereof:

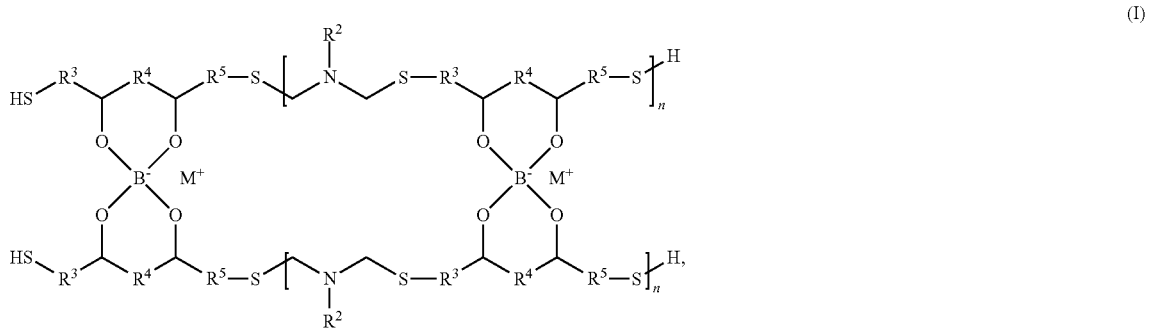

(I)

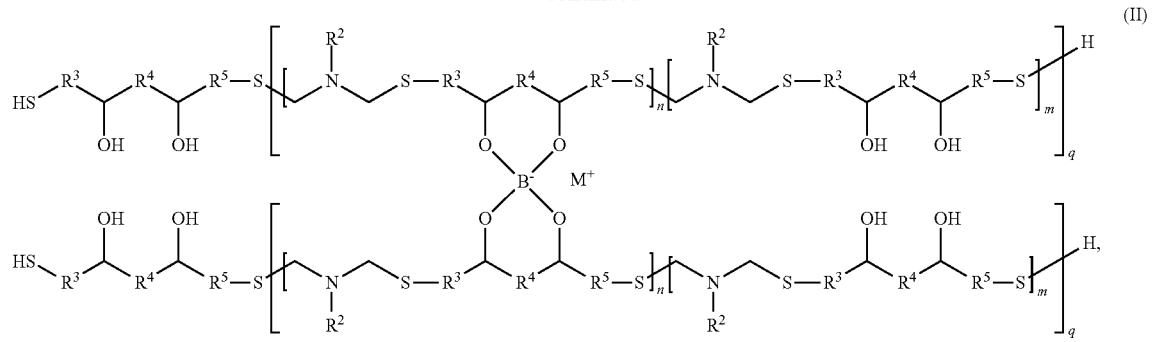

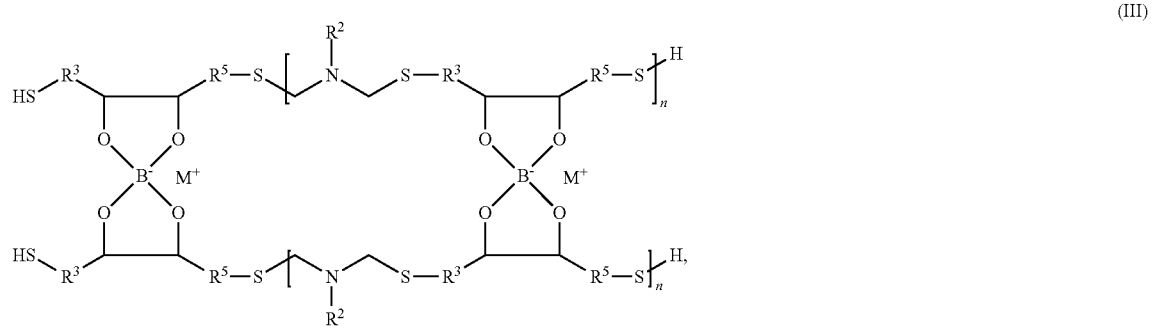

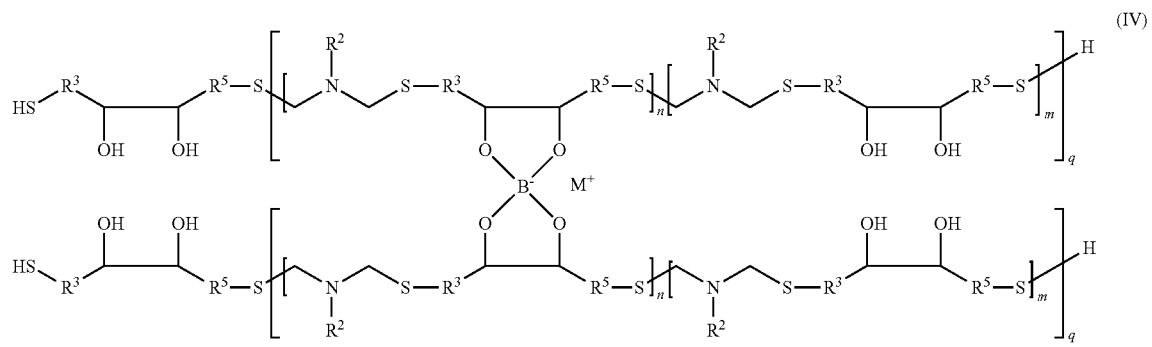

$R^2$ includes hydrogen, fluorine or substituted or unsubstituted alkyl. $R^3$ and $R^5$ include substituted or unsubstituted alkyl, aryl, cycloalkyl, or heterocyclyl. $R^4$ is an unsubstituted, mono-substituted or di-substituted methylene. $M^+$ is a cation. n, m, and q is each a positive integer and the number average molecular weight or weight average molecular weight of the polythioaminals of each of formulas (I), (II), (III), and (IV) is between about 2,000 to about 160,000.

In some embodiments, a material comprising a compound from the group consisting of formulas (V), (VI), (VII), (VIII), and salts thereof:

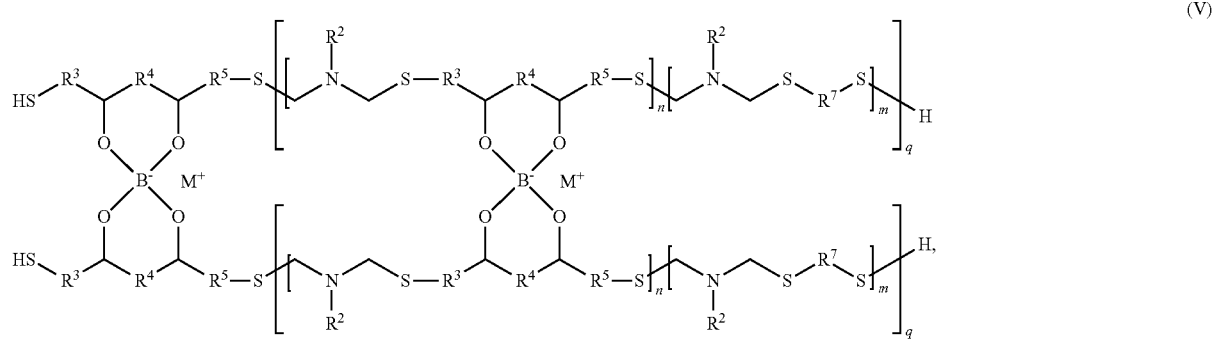

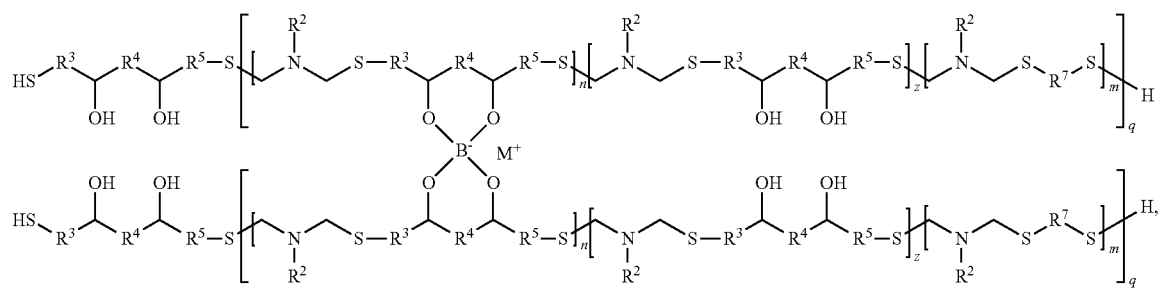

(VI)

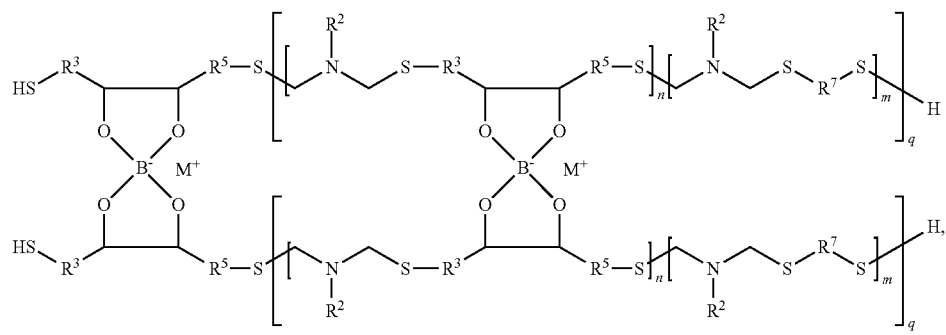

(VII)

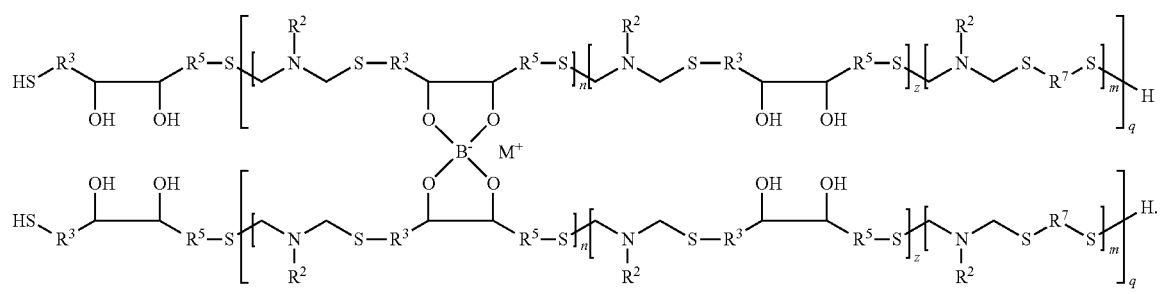

(VIII)

Each instance of $R^2$ is independently hydrogen, fluorine or substituted or unsubstituted alkyl. Each instance of $R^3$ and $R^5$ is independently substituted or unsubstituted alkyl, aryl, cycloalkyl, or heterocyclyl or $R^3$ and $R^5$ combine to form a 5- or 6-membered cycloalkyl or heterocyclyl. Each instance of $R^4$ is independently a substituted or unsubstituted methylene. Each instance of $R^7$ is independently substituted or unsubstituted alkyl, aryl, cycloalkyl, heterocyclyl, polyether, and mixtures thereof. $M^+$ is a cation. n, m, and q is each a positive integer and the number average molecular weight or weight average molecular weight of the polythioaminals of each of formulas (V), (VI), (VII), and (VIII) is between about 2,000 to about 160,000.

DETAILED DESCRIPTION

Embodiments described herein generally relate to polythioaminals and synthesis of polythioaminals. Compounds, compositions, and methods described herein may take advantage of diol-containing monomers for achieving polythioaminals having improved and tailorable physical and mechanical properties.

As used herein, "alkyl" includes an acyclic alkyl moiety containing 1, 2, 3, 4, 5, 6, 7, 8, 9, 10, or more carbon atoms. In some embodiments, alkyl is a C1-C10 alkyl or a C1-C6 alkyl. Examples of alkyl groups include, but are not limited to, methylene, ethylene, propylene, isopropylene, butylene, isobutylene, t-butylene, pentylene, hexylene, heptylene, octylene, nonylene, and decylene.

As used herein, "aryl" includes any monocyclic, bicyclic, or tricyclic carbon ring of up to about 10 carbon atoms in each ring, such as 6 carbon atoms, wherein at least one ring is aromatic, or an aromatic ring system of 5 to 14 carbon atoms which includes a carbocyclic aromatic group fused with a 5- or 6-membered cycloalkyl group. Examples of aryl groups include, but are not limited to, phenyl, naphthyl, tetrahydronaphthyl and indanyl.

As used herein, "cycloalkyl" includes a hydrocarbyl group containing at least one saturated or partially unsaturated ring structure, which may be attached to another chemical structure via a carbon atom in the ring structure. In some embodiments, cycloalkyl includes a saturated or a partially unsaturated C3-C12 cyclic moiety. Examples of cycloalkyl groups include, but are not limited to, cyclopropyl, cyclobutyl, cyclopentyl, cyclopentenyl, cyclohexyl, cyclohexenyl, cycloheptyl, cycloheptenyl, cyclooctenyl, and cyclooctyl.

As used herein, "heterocyclyl" includes saturated, partially unsaturated, or fully unsaturated monocyclic, bicyclic or tricyclic group of 2 to 14 ring-carbon atoms and, in addition to ring-carbon atoms, 1 to 4 heteroatoms selected from P, N, O, and S. In some embodiments, the heterocyclic group is bonded to another moiety through carbon or through a heteroatom. Examples of heterocyclyl include, but are not limited to, pyrrolidinyl, imidazolidinyl, piperidinyl, piperazinyl, tetrahydrofuranyl, morpholinyl, thiazolidinyl, pyridinyl, thienyl, furanyl, pyrimidinyl, imidazolyl, pyrazolyl, thiazolyl, thiadiazolyl, isothiazolyl, oxazolyl, isoxazolyl, oxadiazolyl, pyrrolyl, pyridazinyl, pyrazinyl, quinolinyl, isoquinolinyl, benzofuranyl, benzothienyl, triazinyl, indolyl, benzothiazolyl, benzooxazolyl, benzimidazolyl, isoindolyl, and benzotriazolyl.

As used herein, "alkoxyl" includes RO— where R is alkyl. "Alkoxy" includes, but is not limited to, methoxy, ethoxy, propoxy, isopropoxy, butoxy and isobutoxy.

To covalently crosslink polythioaminals without reductions of their molecular weights, chemistries orthogonal to polythioaminal formation may be utilized (e.g. chemistries that do not interfere with the formation of or dynamic behavior of thioaminals). Boronate ester formation is an orthogonal chemistry that may be used to install crosslinks to linear poly(thioaminals). In aqueous solutions, boronic acids will react with diols to form covalent boron-oxygen bonds at room temperature. In some cases, such as under some basic conditions, the boron-oxygen bond formation may be reversible. In some examples of boronate esters, two hydroxyl moieties in close proximity may be utilized (e.g., two hydroxyl moieties attached to adjacent carbon atoms) to bond with one boron atom. If the distance between these hydroxyl moieties is increased (from one carbon atoms to two carbon atoms) the stability of the resulting boronate ester may decrease. Polymer characteristics that support boronate ester formation for crosslinking polythioaminals may include: (i) water solubility, (ii) diol functionality and (iii) alpha positioning of diol hydroxyl groups. Polythioaminals made from low molecular weight poly(ethylene glycol) (PEG) dithiol monomers are frequently water soluble. Additionally, 1,4-Dimercapto-2,3-butanediol (also known as 1,4-dithioerythritol) contains adjacent hydroxyl moieties and readily polymerizes in the presence of hexahydrotriazines to produce polythioaminals. While polymers made with 1,4-dithioerythritol swell in aqueous solutions, these polymers can be combined with PEG based polythioaminals to produce random copolymers at elevated temperatures (through component exchanging) to enhance their solubility in water. The resulting random copolymer may also possess diol moieties that can undergo crosslinking simply by the addition of a tetraborate, for instance, such as sodium tetraborate, in aqueous solution. Each sodium tetraborate compound added may form a boronate ester with two diol moieties. Therefore, by adjusting the amount of sodium tetraborate added, the degree of crosslinking can be adjusted and physical and mechanical properties of the crosslinked polythioaminal network may be controlled. This chemistry offers the ability to tailor the modulus of the resulting crosslinked polythioaminal. With lower crosslink density, the material possesses more elastic properties, and as the crosslink density increases, the material becomes increasingly rigid.

The structures and schemes of the present disclosure fully embrace neutral polythioaminals and boronate ester polythioaminals that are salts, such as pharmaceutically acceptable salts. Salts include boronate ester polythioaminals having one or more cations associated with each polythioaminal, such as a boronate moiety. A counterion of a boronate ester polythioaminal may be a cation, e.g. $M^+$, such as a metal cation. Cations ($M^+$) include $H^+$ and $NH_4^+$. A counterion of a boronate ester polythioaminal that is a salt includes, but is not limited to, cations associated with boron-containing starting materials, such as borates, used to synthesize a boronate ester polythioaminal. Metal cations include, but are not limited to, $Na^+$, $K^+$, $Li^+$, $Mg^{2+}$, $Ca^{2+}$ and mixtures thereof. The salt forms of boronate ester polythioaminals of the present disclosure may find particular advantage for medical applications due to improved water solubility as compared to a substantially neutral boronate ester polythioaminal. Applications of boronate ester polythioaminals of the present disclosure include, but are not limited to, tissue engineering applications and subcutaneous injection for sustained release of a medicine over a period of time.

Polythioaminals of the present disclosure include polythioaminals of the general structure

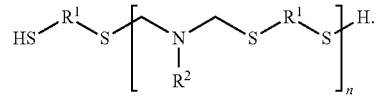

Each instance of $R^1$ is independently

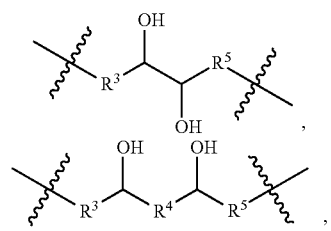

or mixtures thereof. Each instance of $R^3$ and $R^5$ is independently substituted or unsubstituted alkyl, aryl, cycloalkyl, or heterocyclyl or $R^3$ and $R^5$ may combine to form a 5- or 6-membered cycloalkyl or heterocyclyl. Each instance of $R^4$ is independently a substituted or unsubstituted methylene. For substituted $R^3$, $R^4$, and $R^5$, substituents include alkyl, hydroxyl, aryl, alkoxyl, halo, cycloalkyl, and heterocyclyl.

If $R^3$ and $R^5$ combine to form a heterocyclyl that is substituted with hydroxyl, then $R^1$ may be a sugar moiety.-

Sugars include, but are not limited to, hexoses and furanoses. Hexoses include glucose and derivatives thereof. Hexoses include

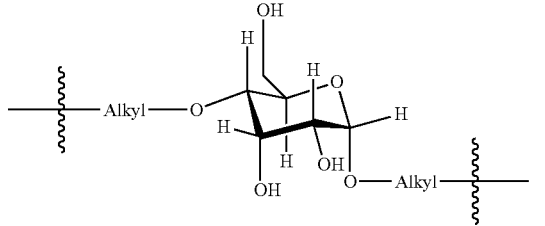

,

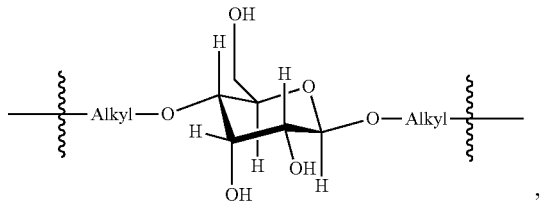

,

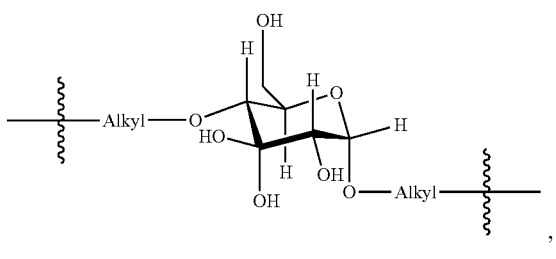

and

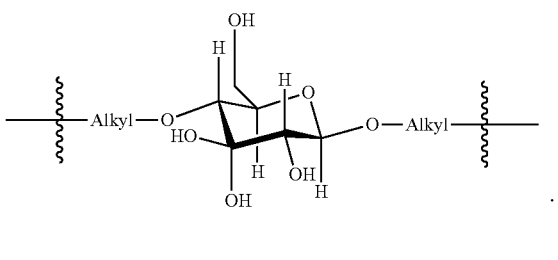

.

Furanoses include ribose and derivatives thereof. Examples of furanoses include, but are not limited to,

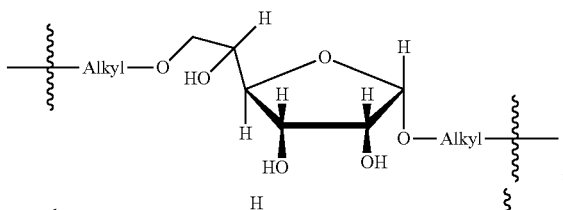

,

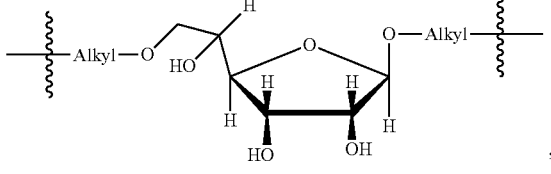

-continued

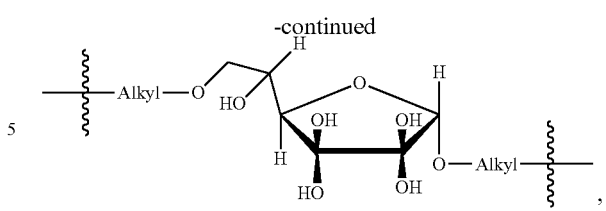

, and

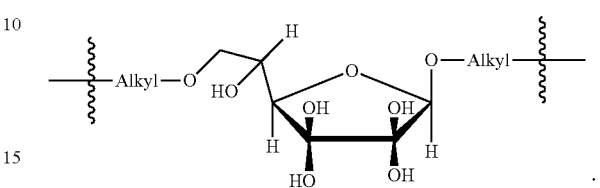

.

Each instance of $R^2$ is independently hydrogen, fluorine, methyl, or an alkyl group such as ethyl, propyl, butyl, pentyl, hexyl, or cyclohexyl. $R^2$ may be substituted or unsubstituted. For substituted $R^2$, substituents include alkyl, aryl, alkoxyl, halo, cycloalkyl, and heterocyclyl. $R^2$ may be substituted with one or more —$NH_2$ moieties. One or more of the —$NH_2$ moieties can form an imine upon treatment with paraformaldehyde. The imines may then form a hexahydrotriazine.

In some embodiments, 'n' of polythioaminals of the general structure

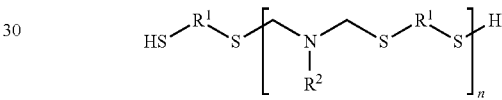

is a positive integer such that the number average molecular weight (Mn) or weight average molecular weight (Mw) of the polythioaminal is between about 2,000 to about 80,000, about 5,500 to about 40,000, such as between about 10,000 to about 25,000, between about 15,000 to about 20,000.

In some embodiments, polythioaminals of the present disclosure include boronate ester polythioaminals of general structure (I).

(I)

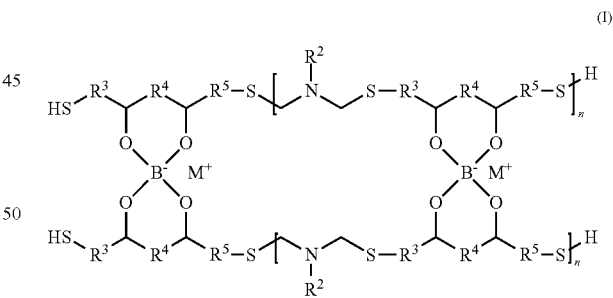

In general structure (I), $R^2$, $R^3$, $R^4$, and $R^5$ are as described above. $M^+$ is a cation. Cations include, but are not limited to, $H^+$, $Na^+$, $K^+$, $Li^+$, $Mg^{2+}$, $Ca^{2+}$ and mixtures thereof. In some embodiments, 'n' of the polythioaminal of general structure (I) is an integer such that the number average molecular weight (Mn) or weight average molecular weight (Mw) of a polythioaminal of general structure (I) is between about 2,000 to about 160,000, about 5,500 to about 80,000, such as between about 10,000 to about 50,000, between about 15,000 to about 40,000.

In some embodiments, polythioaminals of the present disclosure include boronate ester polythioaminals of general structure (II).

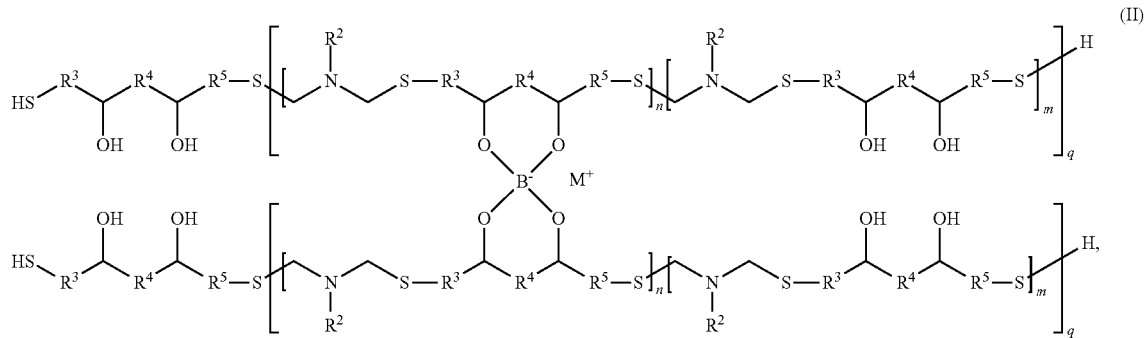

(II)

In general structure (II), $R^2$, $R^3$, $R^4$, $R^5$, and $M^+$ are as described above. In some embodiments, each of 'n', 'm', and 'q' of the polythioaminal of general structure (II) is an integer such that the number average molecular weight (Mn) or weight average molecular weight (Mw) of a polythioaminal of general structure (II) is between about 2,000 to about 160,000, about 5,500 to about 80,000, such as between about 10,000 to about 50,000, between about 15,000 to about 40,000.

In general structure (III), $R^2$, $R^3$, $R^5$, and $M^+$ are as described above. In some embodiments, 'n' of the polythioaminal of general structure (III) is an integer such that the number average molecular weight (Mn) or weight average molecular weight (Mw) of a polythioaminal of general structure (III) is between about 2,000 to about 160,000, about 5,500 to about 80,000, such as between about 10,000 to about 50,000, between about 15,000 to about 40,000.

In some embodiments, polythioaminals of the present disclosure include boronate ester polythioaminals of general structure (IV).

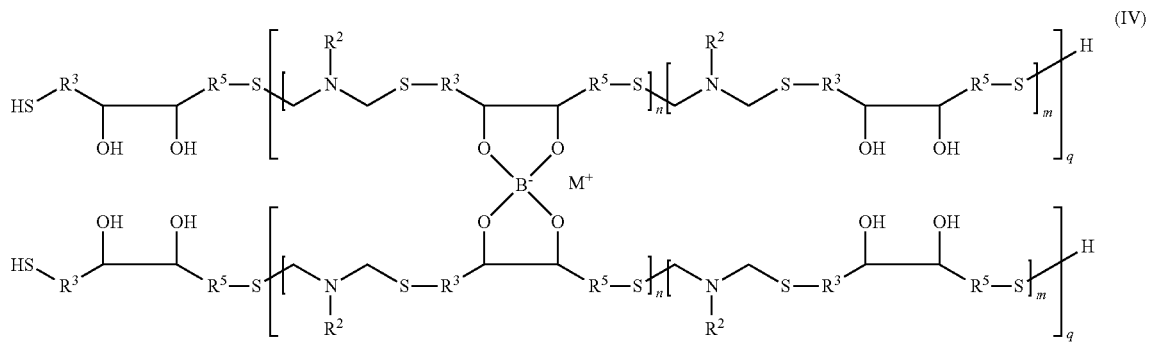

(IV)

In some embodiments, polythioaminals of the present disclosure include boronate ester polythioaminals of general structure (III).

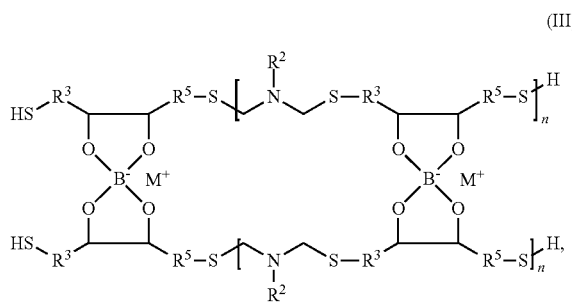

(III)

In general structure (IV), $R^2$, $R^3$, $R^5$, and $M^+$ are as described above. In some embodiments, each of 'n', 'm', and 'q' of the polythioaminal of general structure (IV) is an integer such that the number average molecular weight (Mn) or weight average molecular weight (Mw) of a polythioaminal of general structure (IV) is between about 2,000 to about 160,000, about 5,500 to about 80,000, such as between about 10,000 to about 50,000, between about 15,000 to about 40,000.

In some embodiments, polythioaminals of the present disclosure include boronate ester polythioaminals of general structure (V).

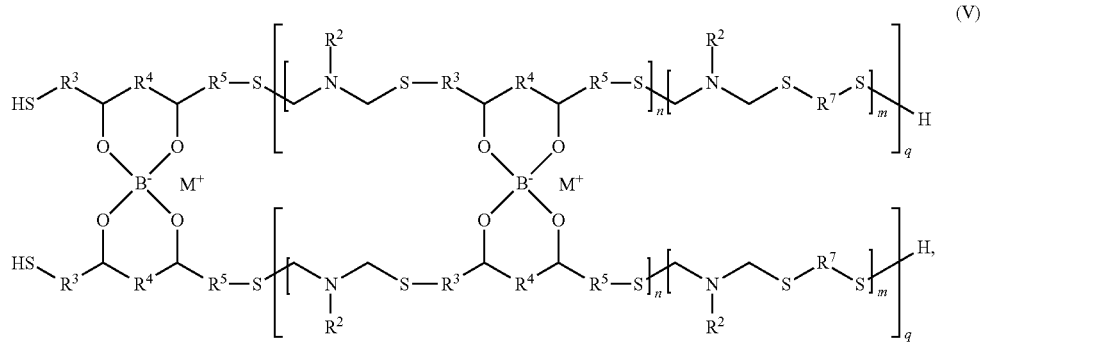

(V)

In general structure (V), $R^2$, $R^3$, $R^4$, $R^5$, and $M^+$ are as described above. Each instance of $R^7$ is independently substituted or unsubstituted alkyl, aryl, cycloalkyl, heterocyclyl, polyether, or mixtures thereof. Polyether include glycols, such as polyethylene glycol and polypropylene glycol. For substituted $R^7$, substituents include alkyl, aryl, alkoxyl, halo, cycloalkyl, and heterocyclyl. Polythioaminals of structure (V) provide, for example, boronate polythioaminals with some monomeric units of the polythioaminal backbone having boronate ester and/or hydroxyl moieties, whereas other monomeric units of the polythioaminal backbone do not. This provides moieties along a polythioaminal backbone that may include other crosslinkable/reactive functionalities and/or moieties to adjust solubility and/or adjust physical or mechanical properties of the overall polythioaminal structure.

In some embodiments, each of 'n', 'm', and 'q' of the polythioaminal of general structure (V) is an integer such that the number average molecular weight (Mn) or weight average molecular weight (Mw) of a polythioaminal of general structure (V) is between about 2,000 to about 160,000, about 5,500 to about 80,000, such as between about 10,000 to about 50,000, between about 15,000 to about 40,000.

In some embodiments, polythioaminals of the present disclosure include boronate ester polythioaminals of general structure (VI).

In general structure (VI), $R^2$, $R^3$, $R^4$, $R^5$, $R^7$, and $M^+$ are as described above. In some embodiments, each of 'n', 'z', 'm', and 'q' of the polythioaminal of general structure (VI) is an integer such that the number average molecular weight (Mn) or weight average molecular weight (Mw) of a polythioaminal of general structure (VI) is between about 2,000 to about 160,000, about 5,500 to about 80,000, such as between about 10,000 to about 50,000, between about 15,000 to about 40,000. Like formula (V), polythioaminals of formula (VI) provide, for example, boronate polythioaminals with some monomeric units of the polythioaminal backbone having boronate ester and/or hydroxyl moieties, whereas other monomeric units of the polythioaminal backbone do not. This provides moieties along a polythioaminal backbone that may include other crosslinkable/reactive functionalities and/or moieties to adjust solubility and/or adjust physical or mechanical properties of the overall polythioaminal structure.

In some embodiments, polythioaminals of the present disclosure include boronate ester polythioaminals of general structure (VII).

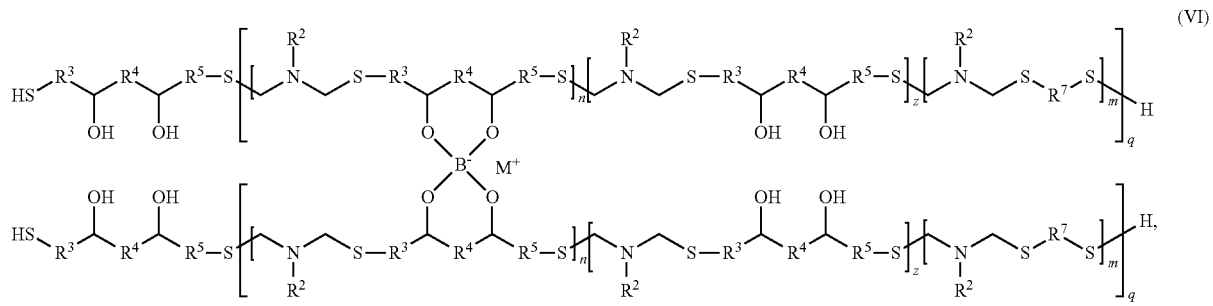

(VI)

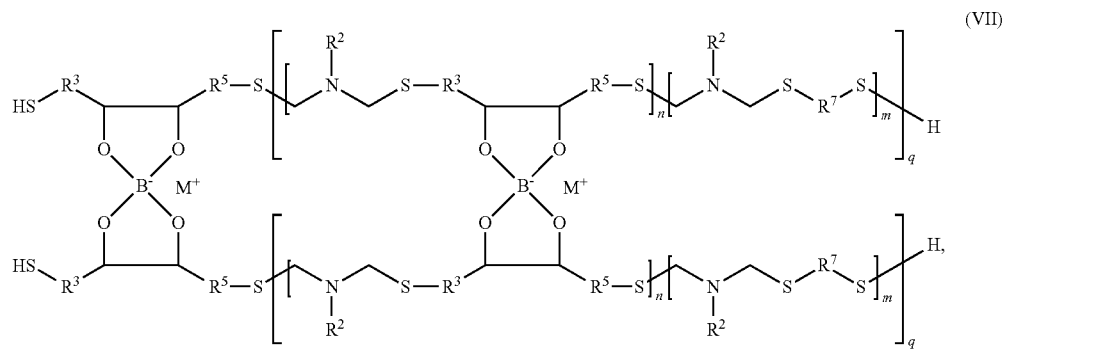

(VII)

In general structure (VII), $R^2$, $R^3$, $R^5$, $R^7$, and $M^+$ are as described above. In some embodiments, each of 'n', 'm', and 'q' of the polythioaminal of general structure (VII) is an integer such that the number average molecular weight (Mn) or weight average molecular weight (Mw) of a polythioaminal of general structure (VII) is between about 2,000 to about 160,000, about 5,500 to about 80,000, such as between about 10,000 to about 50,000, between about 15,000 to about 40,000.

Polythioaminals of structure (VII) provide, for example, boronate polythioaminals with some monomeric units of the polythioaminal backbone having boronate ester and/or hydroxyl moieties, whereas other monomeric units of the polythioaminal backbone do not. This provides moieties along a polythioaminal backbone that may include other crosslinkable/reactive functionalities and/or moieties to adjust solubility and/or adjust physical or mechanical properties of the overall polythioaminal structure.

In some embodiments, polythioaminals of the present disclosure include boronate ester polythioaminals of general structure (VIII).

integer such that the number average molecular weight (Mn) or weight average molecular weight (Mw) of a polythioaminal of general structure (VIII) is between about 2,000 to about 160,000, about 5,500 to about 80,000, such as between about 10,000 to about 50,000, between about 15,000 to about 40,000.

Polythioaminals of structure (VIII) provide, for example, boronate polythioaminals with some monomeric units of the polythioaminal backbone having boronate ester and/or hydroxyl moieties, whereas other monomeric units of the polythioaminal backbone do not. This provides moieties along a polythioaminal backbone that may include other crosslinkable/reactive functionalities and/or moieties to adjust solubility and/or adjust physical or mechanical properties of the overall polythioaminal structure.

In some embodiments, polythioaminals of the present disclosure include boronate ester polythioaminals having one or more sugar moieties in the polythioaminal backbone (e.g., $R^3$ and $R^5$ combine to form a heterocyclyl that is substituted with hydroxyl). A non-limiting example of a

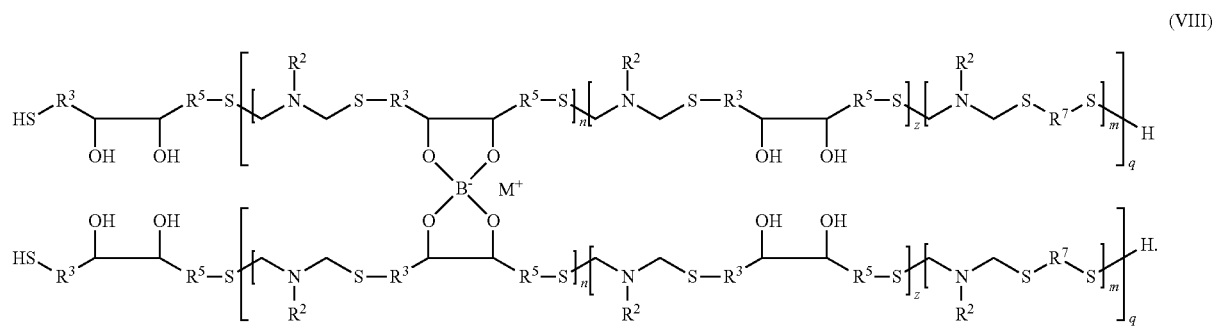

(VIII)

In general structure (VIII), $R^2$, $R^3$, $R^5$, $R^7$, and $M^+$ are as described above. In some embodiments, each of 'n', 'z', 'm', and 'q' of the polythioaminal of general structure (VIII) is an boronate ester polythioaminal having one or more sugar moieties in the polythioaminal backbone is shown in structure (IX).

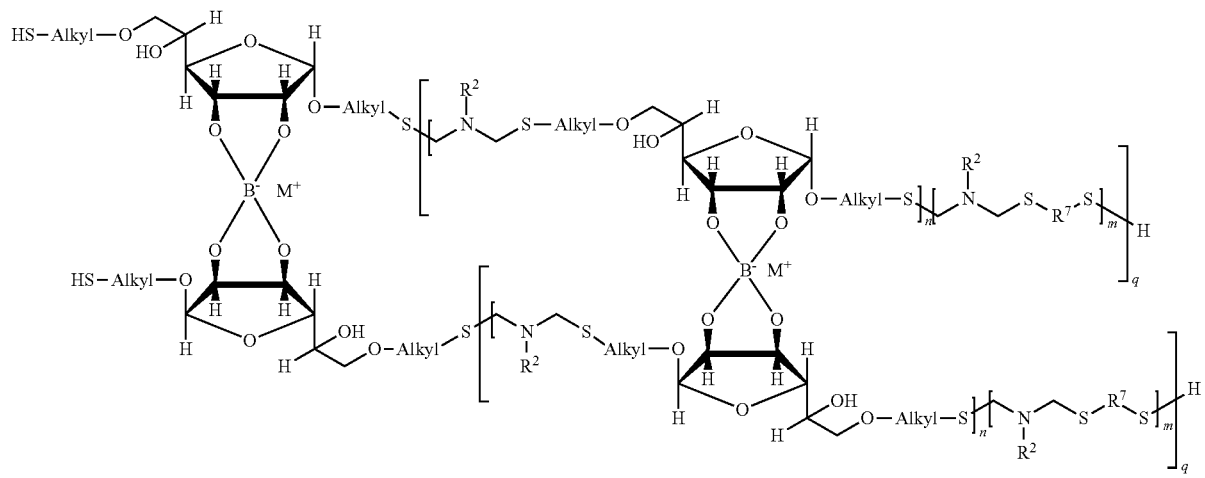

(IX)

In general structure (IX), $R^2$ $R^7$, and $M^+$ are as described above. In some embodiments, each of 'n', 'm', and 'q' of the polythioaminal of general structure (IX) is an integer such that the number average molecular weight (Mn) or weight average molecular weight (Mw) of a polythioaminal of general structure (IX) is between about 2,000 to about 160,000, about 5,500 to about 80,000, such as between about 10,000 to about 50,000, between about 15,000 to about 40,000.

Polythioaminals of structure (IX) provide, for example, boronate polythioaminals with some monomeric units of the polythioaminal backbone having boronate ester and/or hydroxyl moieties, whereas other monomeric units of the polythioaminal backbone do not. This provides moieties along a polythioaminal backbone that may include other crosslinkable/reactive functionalities and/or moieties to adjust solubility and/or adjust physical or mechanical properties of the overall polythioaminal structure.

Polythioaminal formation (and boronate ester polythioaminal) formations of the present disclosure may proceed as a neat mixture of starting material or may be performed in a solvent or mixtures of solvents, to control viscosity. Polar aprotic solvents such as N-methyl-2-pyrrolidone (NMP), dimethylsulfoxide (DMSO), N,N-dimethylformamide (DMF), N,N-dimethylacetamide (DMA), propylene carbonate (PC), propylene glycol methyl ether acetate (PGMEA) or mixtures thereof, may be used. The aforementioned polar solvents may be used to dissolve paraformaldehyde.

In other embodiments, a low polarity or non-polar aprotic solvent may be used to produce a polythioaminal or boronate ester polythioaminal, such as tetrahydrofuran, dimethyl ether, methylene chloride, toluene, benzene, and kerosene.

Scheme 1

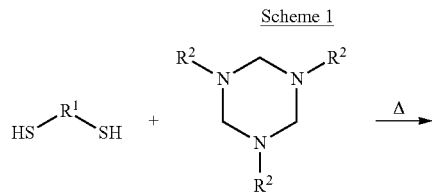

-continued

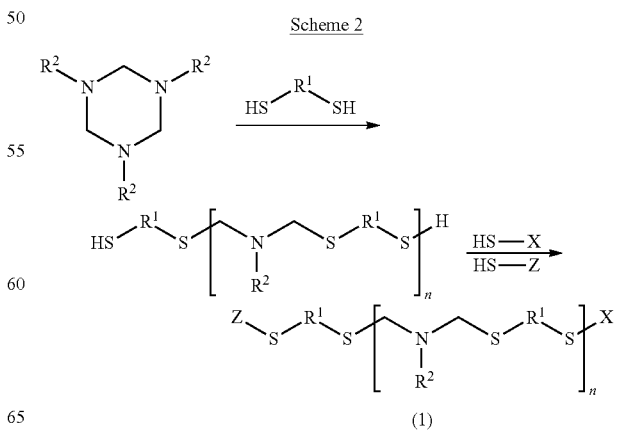

Scheme 1 illustrates polythioaminal formation from a dithiol and a hexahydrotriazine. Polythioaminal formation may be promoted with the application of heat to the reaction mixture. Dithiol starting material may be obtained from commercial suppliers such as Sigma-Aldrich, or may be synthesized. Hexahydrotriazines may be formed by the reaction of primary diamines with paraformaldehyde to form diimines which then form hexahydrotriazines. The hexahydrotriazines may be formed in situ.

Alkane dithiols such as butane dithiol, pentane dithiol, and hexane dithiol may be used as starting material. Aromatic dithiols such as benzene dithiol, toluene dithiol, and xylene dithiol may also be used as starting material. The dithiol may be a polymer species, such as a dithiol-capped polyolefin. Dithio-polyol species may also be used, such as dithio-alkane diols, triols, and the like. Each instance of $R^2$ may independently be hydrogen, fluorine, methyl, or an alkyl group such as ethyl, propyl, butyl, pentyl, hexyl, or cyclohexyl.

Scheme 2

(1)

Scheme 2 illustrates polythioaminal formation from a dithiol and a hexahydrotriazine in addition to end capping of a polythioaminal. X and Z are independently a sulfur-bonded species.

For polythioaminal and boronate ester polythioaminal formation, the order and rate of addition of the starting material may be adjusted, and the reaction mixture may be heated at a temperature from about 50° C. to about 150° C., for a time period from about 1 hour to about 24 hours, such as at a temperature of about 85° C. for about 18 hours. The temperature of the reaction may be adjusted depending on the boiling point of the solvent, and/or if reflux conditions are desired. Isolation and purification of the polythioaminal/boronate ester polythioaminal product(s) may be achieved by cooling the reaction mixture, followed by precipitation and washing in a suitable solvent and drying. The polythioaminal/boronate ester polythioaminal product(s) may be redissolved in a suitable deuterated solvent for nuclear magnetic resonance experiments, such as DOSY-NMR and/or other 2D NMR techniques to analyze the polymer product and identify the peaks corresponding to the repeat unit moieties. Gel permeation chromatography (GPC) may also be used to determine the number average molecular weight of the substituted polymer. In some embodiments, polythioaminals of the present disclosure have a polydispersity index (PDI) of between about 1.00 to about 3.00, for example about 2.

As an exemplary process for polythioaminal formation, in a stirred vessel, the dithiol precursor is added to 1.3 equivalents of the triazine precursor. The vessel is purged with nitrogen or other inert gas and sealed, and the reaction mixture is heated to about 85° C. The reaction mixture is maintained at about 85° C. for about 18 hours to form polythioaminal(s). Vacuum is then applied to the vessel to remove volatile byproducts, driving growth in molecular weight of the resulting polymer molecules according to LeChatelier's Principle. The reaction is allowed to proceed for 24 hours, during which stirring may cease due to viscosity of the mixture. The resulting polymer is typically optically transparent and may range from a solid to a viscous liquid.

Boronate ester polythioaminals of the present disclosure may be terminated at the thiol termini with any suitable thiol reactive species (as shown in Scheme 2, X and Z moieties). X and Z may be any suitable thiol reactive species. Of particular use, X and/or Z may be a therapeutic agent for treating a medical condition. X and/or Z may be a species selected from hydrogen, an alkane thiol, an aromatic thiol such as a thiophenol or a thioaniline, a peptide, a protein, a thio-acid, a nucleotide, or combinations thereof. In some embodiments, X and Z are not both hydrogen. X and/or Z may be a reactive or non-reactive species, a cargo, a linking group, a medicine, a functional species for further modification after construction of the polymer (A) or the polymer (B), a polymerization starter, a chemical species capable of initiating depolymerization, or a combination thereof. Any of the above species may be a linking species or group, or a non-linking species or group.

When X is a linking group, the following structure may result:

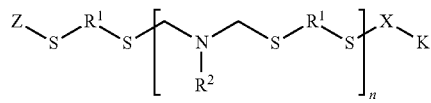

where K is any species bondable to X, and $R^1$, $R^2$, and n are defined as above. Z may also be a linking group, which may be the same as or different from X, in which case a K group may also be bonded to Z. K may be another polythioaminal that links to X via thiol reactivity, as X is linked to a polythioaminal/boronate ester polythioaminal product, or K may be any other desired species, for example another polymer, peptide, reactive or non-reactive species, cargo, linking group, functional species, polymerization starter, or depolymerization starter that links to X via any suitable linkage. K may also be a species selected from hydrogen, an alkane thiol, an aromatic thiol such as a thiophenol or a thioaniline, a peptide, a protein, a thio-acid, a nucleotide, and combinations thereof.

As noted above, boronate ester polythioaminals of the present disclosure may be formed from polythioaminals, or formed in one pot from dithiols of structure

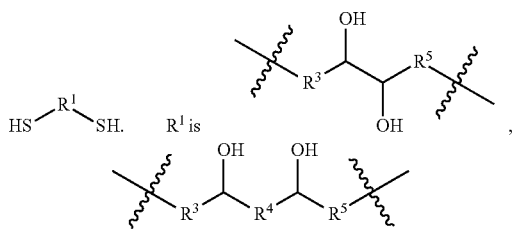

or mixtures thereof. $R^3$, $R^4$, and $R^5$ are as described above.

Borates for the synthesis of polythioaminals of the present disclosure include, but are not limited to, sodium tetrahydroxyborate, potassium tetrahydroxyborate, sodium tetraalkoxyborates, potassium tetraalkoxyborates, lithium tetrahydroxyborate, lithium tetralkoxyborates, postassium tetrahaloborates, sodium tetrahaloborates, lithium tetrahaloborates.

For the following schemes (Schemes 3 through 10), $R^2$, $R^3$, $R^4$, $R^5$, and $R^7$ are as described above.

As shown in Scheme 3, a polythioaminal is formed from a dithiol of the structure

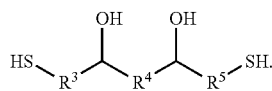

Scheme 3

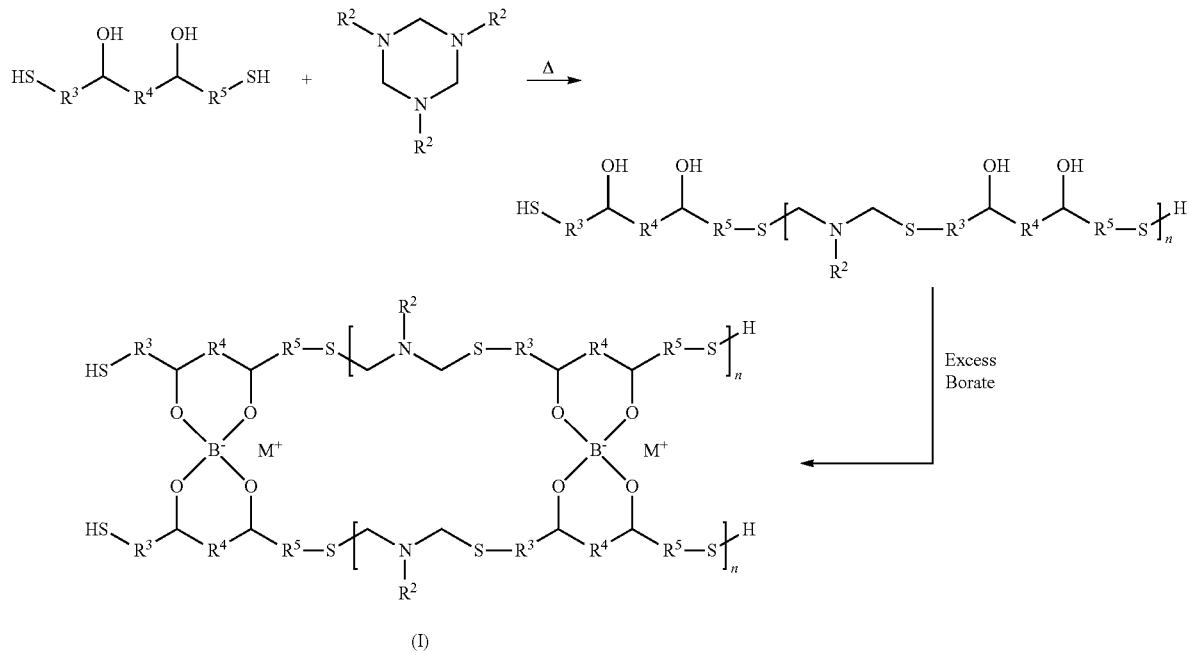

(I)

The polythioaminal is subsequently treated with a molar excess of borate, such as sodium tetrahydroxyborate, to yield a boronate ester of Formula (I). The borate reacts with the hydroxyl moieties of the polythioaminals to crosslink one or more polythioaminals along the polymer backbone. Crosslinked polythioaminals (i.e., boronate esters) of the present disclosure may be dimeric, trimeric, tetrameric, pentameric, hexameric, heptameric, octameric, nonameric, decameric, or higher order crosslinked polythioaminals.

As shown in Scheme 4, a polythioaminal is formed from a hexahydrotriazine and a dithiol of the structure

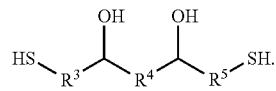

Scheme 4

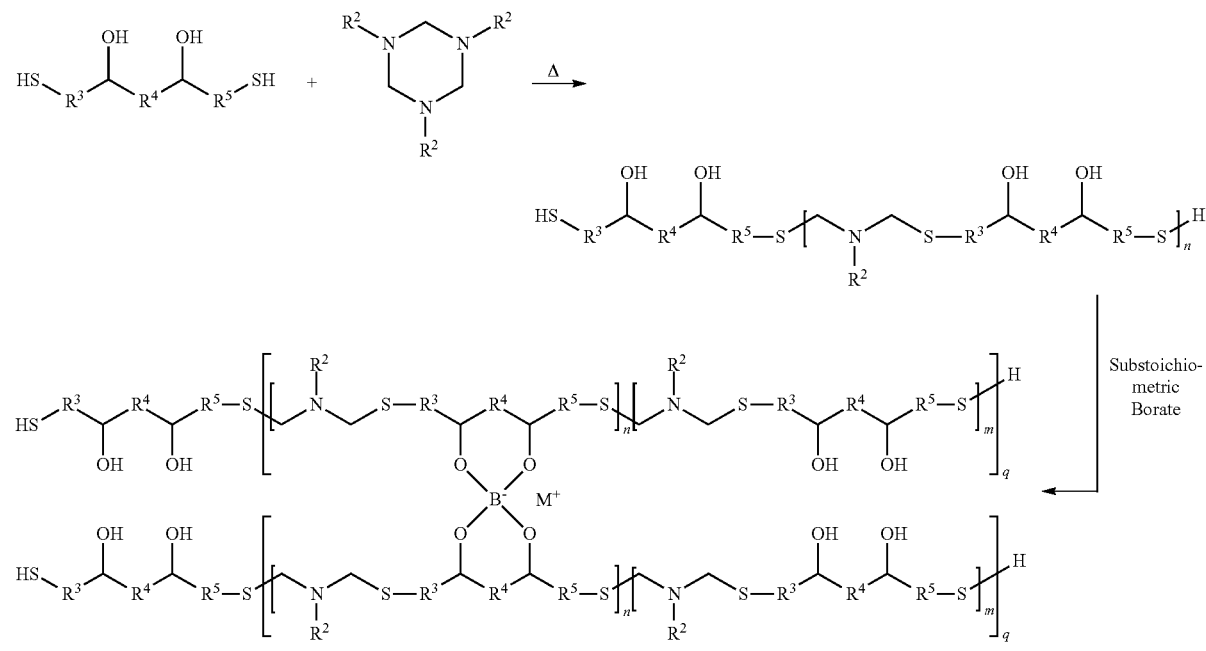

(II)

The polythioaminal is subsequently treated with a substoichiometric amount of borate, such as sodium tetrahydroxyborate, to yield a boronate ester of Formula (II). In some embodiments, boronate ester polythioaminals of Formula (II) are between about 0.1% crosslinked and about 50% crosslinked, such as about 5% crosslinked and about 30% crosslinked, such as about 10% crosslinked and about 20% crosslinked. As used herein, "% crosslinked" is defined as a percent of monomeric units of the polythioaminal backbone that are crosslinked as boronate ester moieties. Monomeric units are denoted by brackets in the structure of Formula (II).

As shown in Scheme 5, a polythioaminal is formed from a hexahydrotriazine and a dithiol of the structure

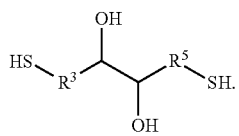

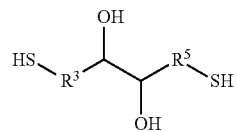

with 5-membered boronate ester rings formed along the polythioaminal backbone to provide stable ring structures on/within the boronate ester polythioaminal backbone.

As shown in Scheme 6, a polythioaminal is formed from a hexahydrotriazine and a dithiol of the structure

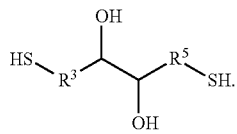

The polythioaminal is subsequently treated with a substoichiometric amount of borate, such as sodium tetrahydroxyborate, to yield a boronate ester of Formula (IV). In some embodiments, boronate ester polythioaminals of Formula (IV) are between about 0.1% crosslinked and about 50% crosslinked, such as between about 5% crosslinked and about 30% crosslinked, for example between about 10%

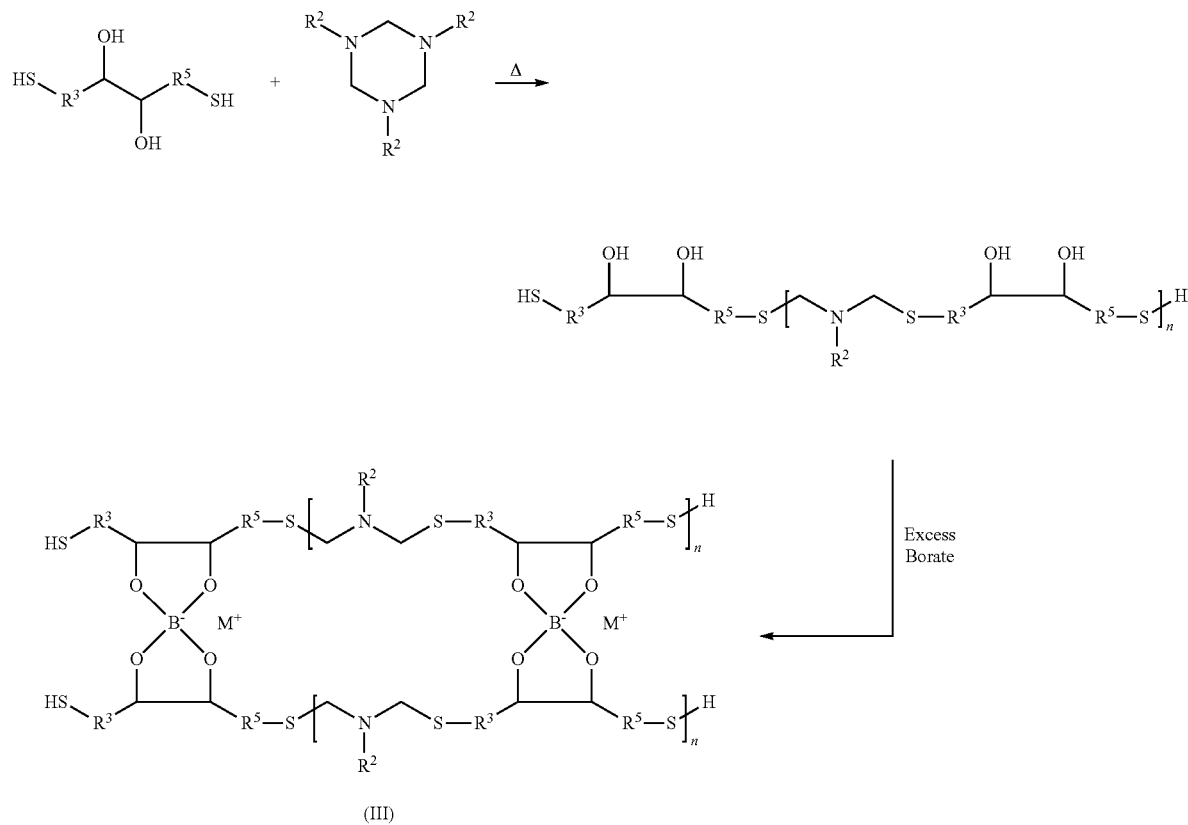

The polythioaminal is subsequently treated with a molar excess of borate, such as sodium tetrahydroxyborate, to yield a boronate ester of Formula (III). In some embodiments, boronate ester polythioaminals are synthesized from dithiols of the structure crosslinked and about 20% crosslinked. As used herein, "% crosslinked" is defined as a percent of monomeric units of the polythioaminal backbone that are crosslinked as boronate ester moieties. Monomeric units are denoted by brackets in the structure of Formula (IV).

Scheme 6

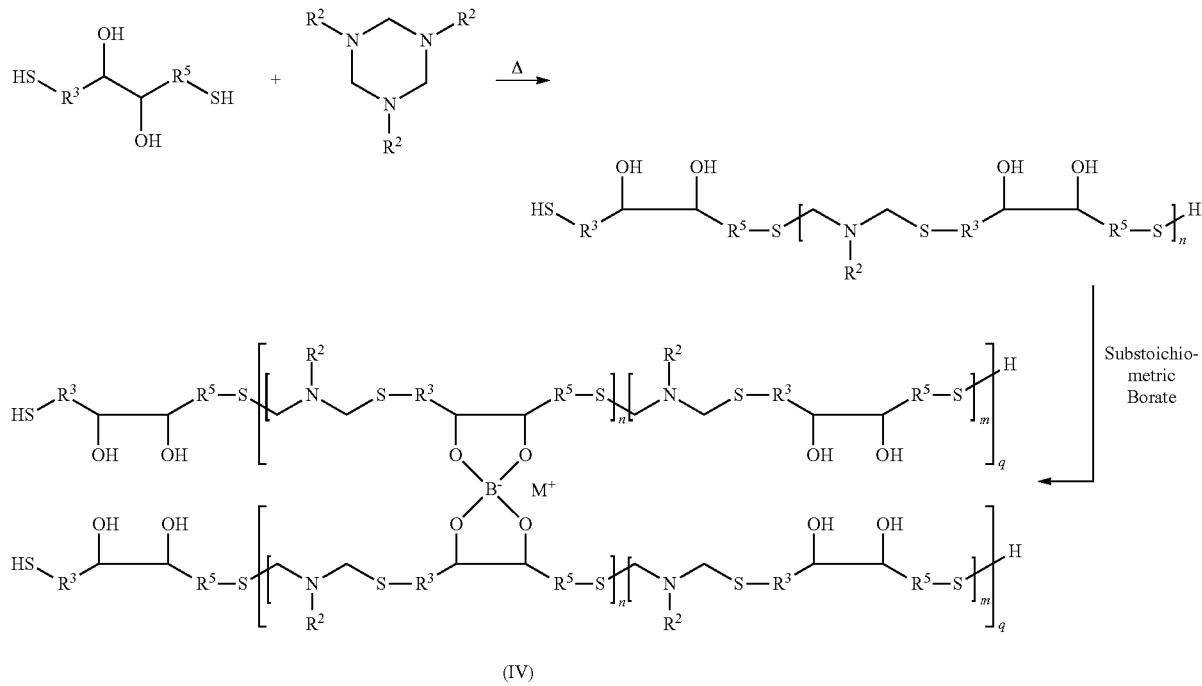

(IV)

In some embodiments, boronate ester polythioaminals of the present disclosure may be formed from dithiol mixtures comprising (1) a dithiol of the structure

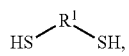

where $R^1$ is

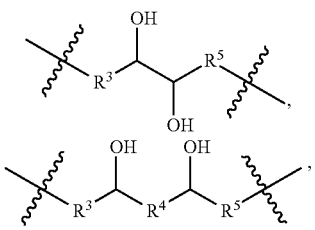

and mixtures thereof, and (2) a dithiol of the structure

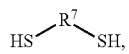

where $R^7$ is substituted or unsubstituted alkyl, substituted or unsubstituted aryl, substituted or unsubstituted cycloalkyl, substituted or unsubstituted heterocyclyl, substituted or unsubstituted polyether or mixtures thereof. Ether includes polyethylene glycol and polypropylene glycol. For substituted $R^7$, substituents include alkyl, aryl, alkoxyl, halo, cycloalkyl, and heterocyclyl. These embodiments provide, for example, boronate polythioaminals where some monomeric units of the polythioaminal backbone contain boronate ester and/or hydroxyl moieties, whereas other monomeric units of the polythioaminal backbone do not.

As shown in Scheme 7, a polythioaminal is formed from a hexahydrotriazine and a dithiol mixture of (1) the structure

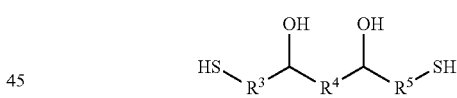

and (2) the structure

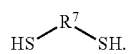

The polythioaminal is subsequently treated with a molar excess of borate, such as sodium tetrahydroxyborate, to yield a boronate ester of Formula (V).

Scheme 7

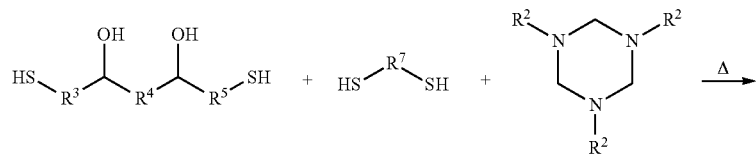

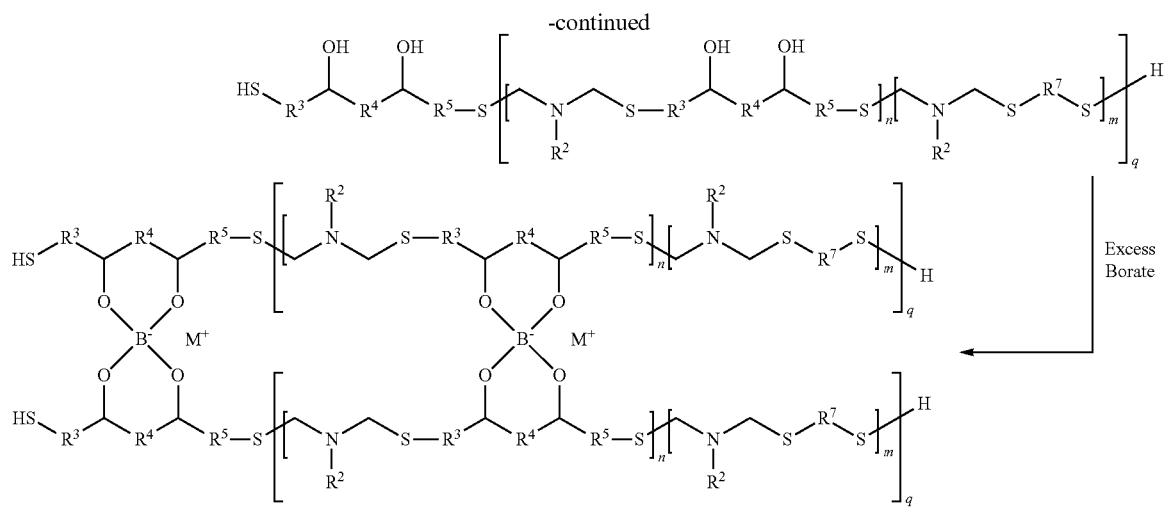
(V)
As shown in Scheme 8, a polythioaminal is formed from a hexahydrotriazine and a dithiol mixture of (1) the structure
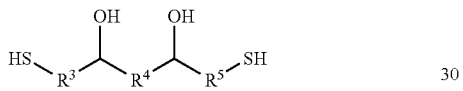
and (2) the structure
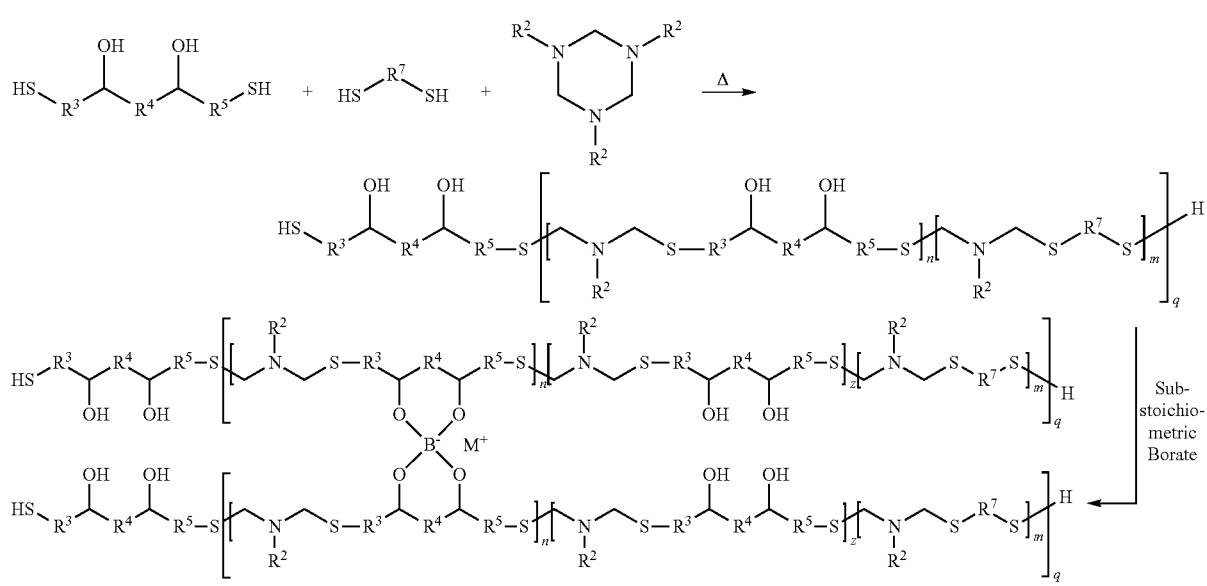
(VI)

The polythioaminal is subsequently treated with a substoichiometric amount of borate, such as sodium tetrahydroxyborate, to yield a boronate ester of Formula (VI). In some embodiments, boronate ester polythioaminals of Formula (VI) are between about 0.1% crosslinked and about 50% crosslinked, such as about 5% crosslinked and about 30% crosslinked, such as about 10% crosslinked and about 20% crosslinked. As used herein, "% crosslinked" is defined as a percent of monomeric units of the polythioaminal backbone that are crosslinked as boronate ester moieties. Monomeric units are denoted by brackets in the structure of Formula (VI).

As shown in Scheme 9, a polythioaminal is formed from a hexahydrotriazine and a dithiol mixture of (1) the structure

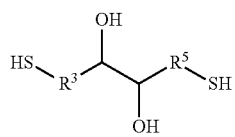

and (2) the structure

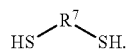

The polythioaminal is subsequently treated with a molar excess of borate, such as sodium tetrahydroxyborate, to yield a boronate ester of Formula (VII).

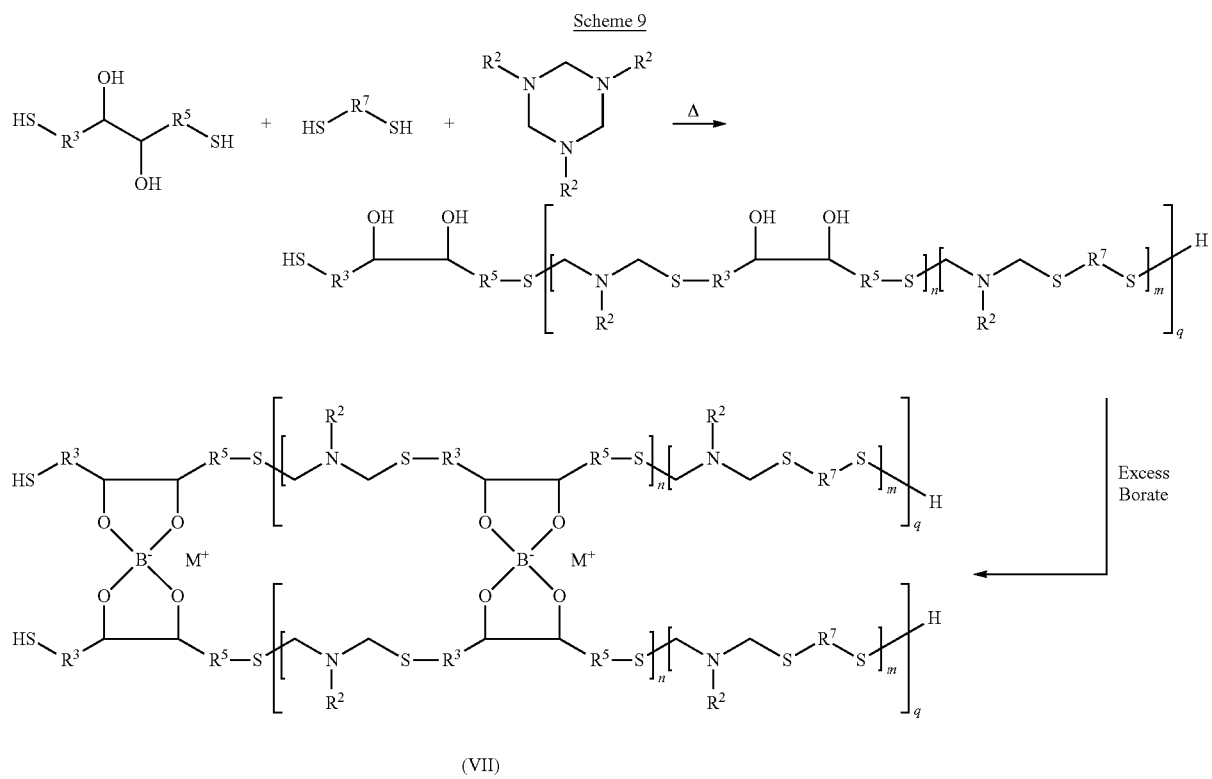

(VII)

As shown in Scheme 10, a polythioaminal is formed from a hexahydrotriazine and a dithiol mixture of (1) the structure

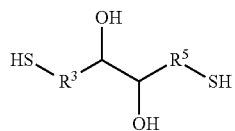

and (2) the structure

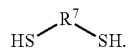

Scheme 10

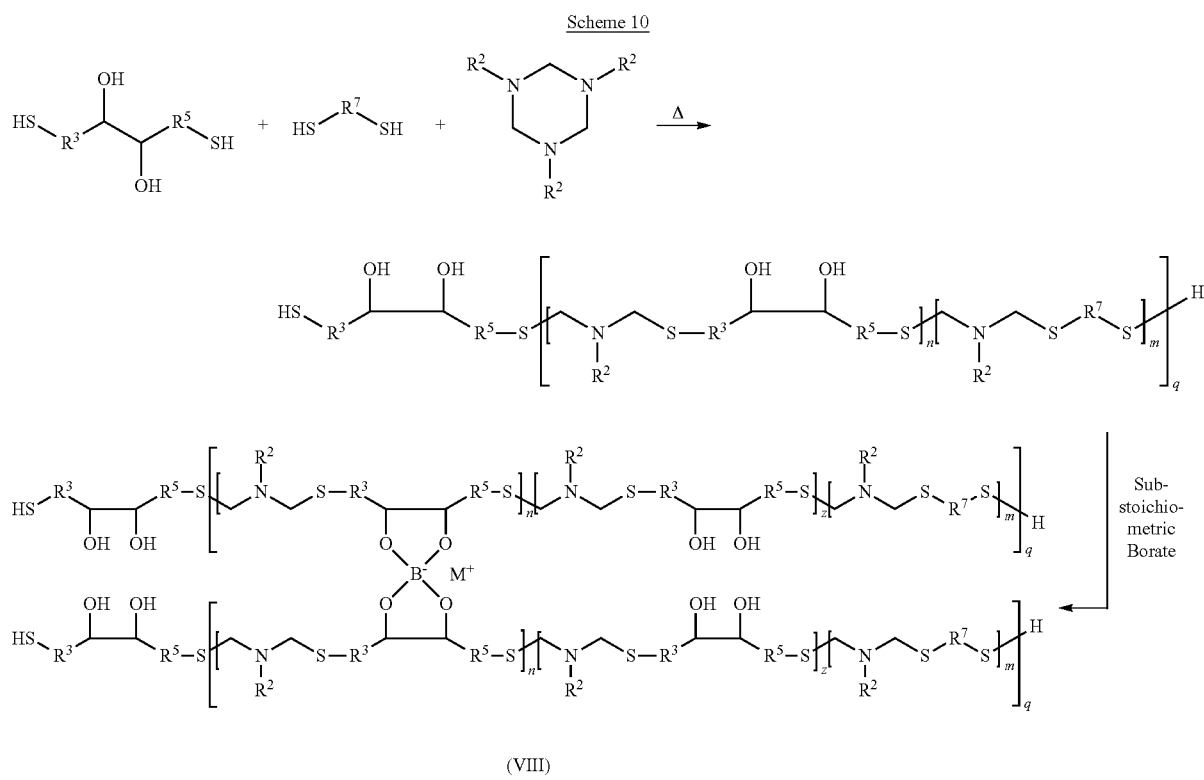

(VIII)

The polythioaminal is subsequently treated with a substoichiometric amount of borate, such as sodium tetrahydroxyborate, to yield a boronate ester of Formula (VIII). In some embodiments, boronate ester polythioaminals of Formula (VIII) are between about 0.1% crosslinked and about 50% crosslinked, such as about 5% crosslinked and about 30% crosslinked, such as about 10% crosslinked and about 20% crosslinked. As used herein, "% crosslinked" is defined as a percent of monomeric units of the polythioaminal backbone that are crosslinked as boronate ester moieties. Monomeric units are denoted by brackets in the structure of Formula (VIII).

Compounds and syntheses described herein provide access to crosslinked polythioaminals with controllable physical and mechanical properties for improved and controlled applications. The degree of crosslinking can be adjusted and physical and mechanical properties of the crosslinked polythioaminal network may be controlled. This chemistry offers the ability to tailor, for example, the modulus of the resulting crosslinked polythioaminal in addition to favorable ionic forms for some medicinal applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A material comprising a compound from the group consisting of formulas (I), (II), (III), (IV), and salts thereof:

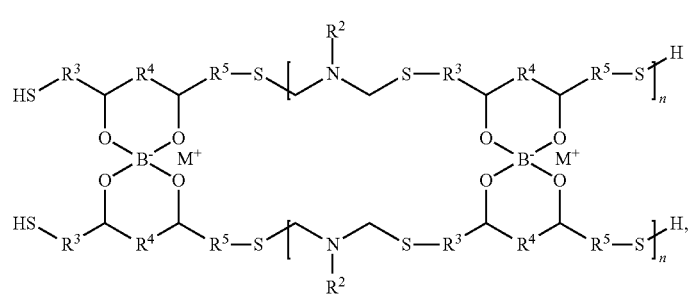

(I)

-continued

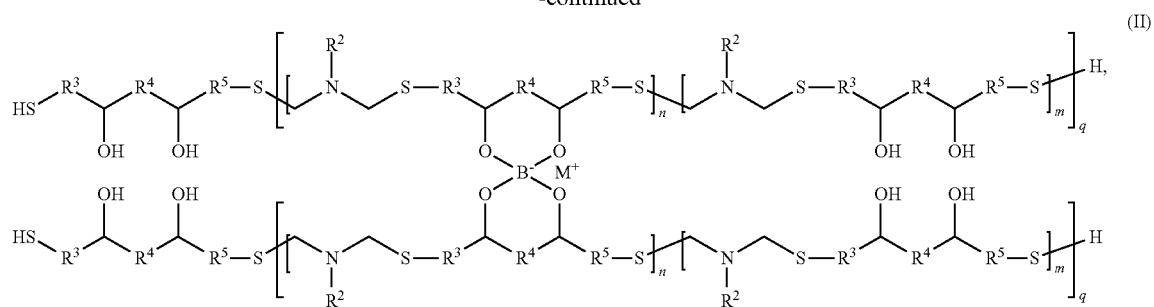

(II)

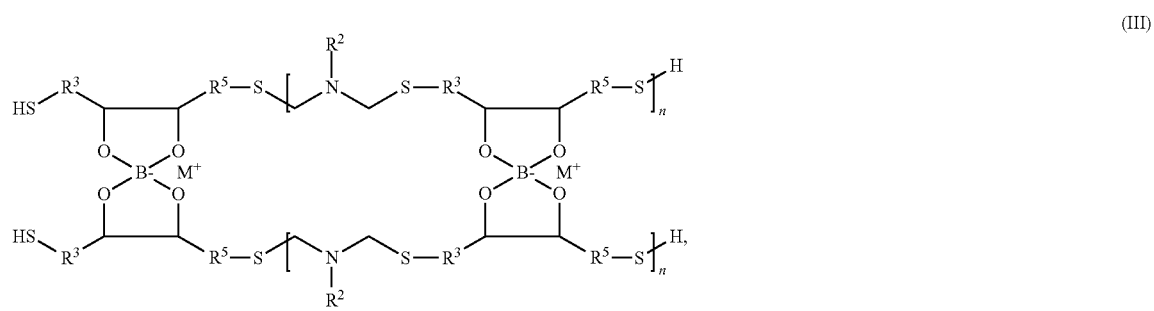

(III)

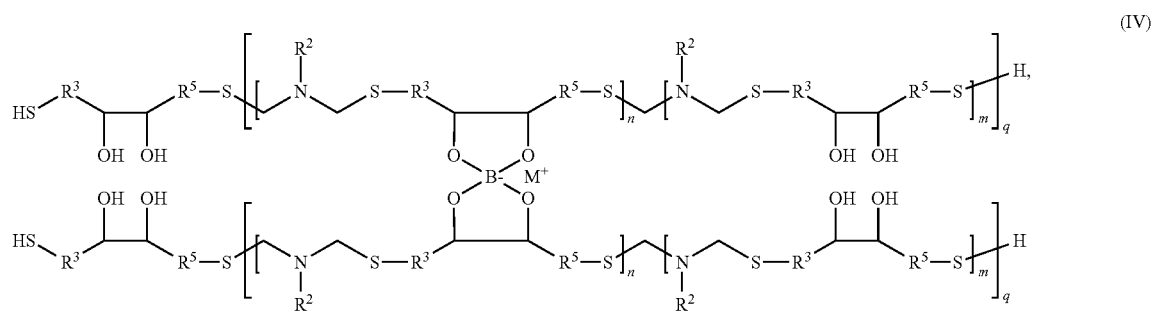

(IV)

wherein:
each instance of $R^2$ is independently selected from the group consisting of hydrogen, halo, aryl, alkoxyl, cycloalkyl, heterocyclyl, $-NH_2$, and substituted or unsubstituted alkyl;
each instance of $R^3$ and $R^5$ is independently selected from the group consisting of substituted or unsubstituted alkyl, aryl, cycloalkyl, or heterocyclyl or $R^3$ and $R^5$ combine to form a 5- or 6-membered cycloalkyl or heterocyclyl;
each instance of $R^4$ is independently a substituted or unsubstituted methylene;
$M^+$ is a cation; and
each of n, m, and q is a positive integer and the number average molecular weight or weight average molecular weight of the polythioaminals of each of formulas (I), (II), (III), and (IV) is between about 2,000 to about 160,000.

2. The material of claim 1, wherein each instance of $M^+$ is independently selected from the group consisting of $Na^+$, $K^+$, $Li^+$, $Mg^{2+}$, and $Ca^{2+}$.

3. The material of claim 1, wherein at least one of $R^3$ and $R^5$ is substituted with alkyl, hydroxyl, aryl, alkoxyl, halo, cycloalkyl, or heterocyclyl.

4. The material of claim 1, wherein the compound is selected from the group consisting of:

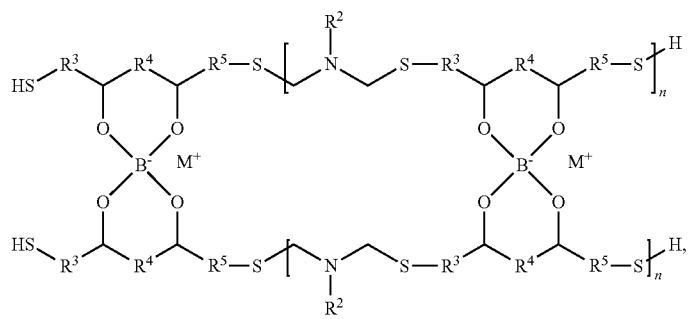

(I)

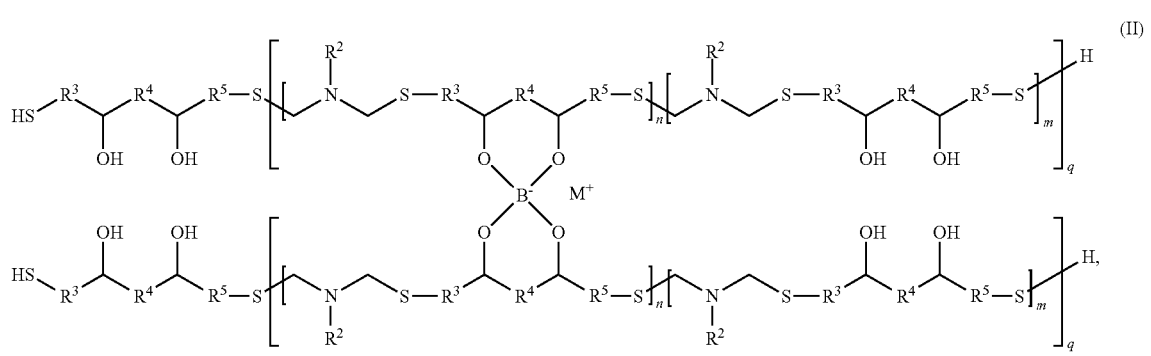

(II)

and $R^4$ is substituted with one or more of alkyl, aryl, alkoxyl, halo, cycloalkyl, or heterocyclyl.

5. The material of claim 1, wherein $R^2$ is substituted with one or more of alkyl, aryl, alkoxyl, halo, cycloalkyl, heterocyclyl, or —$NH_2$.

6. The material of claim 1, wherein the number average molecular weight or weight average molecular weight of the compounds of each of formulas (I), (II), (III), and (IV) is between about 15,000 to about 40,000.

7. The material of claim 1, wherein $R^3$ and $R^5$ combine to form a hydroxyl substituted 5- or 6-membered heterocyclyl.

8. The material of claim 7, wherein the hydroxyl substituted 5- or 6-membered heterocyclyl is selected from the group consisting of:

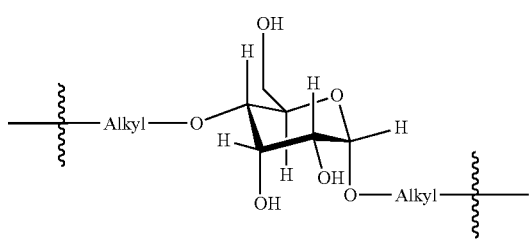

,

-continued

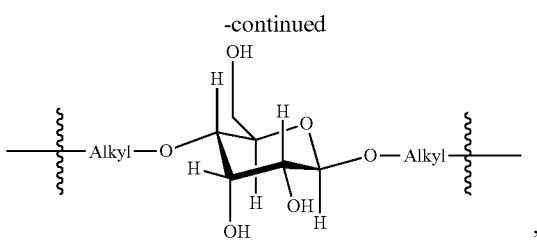

,

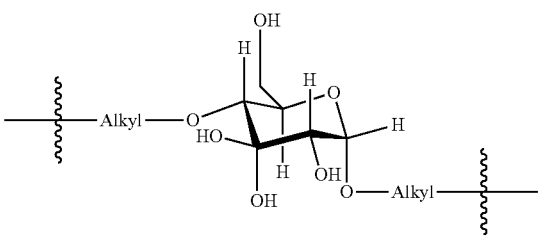

,

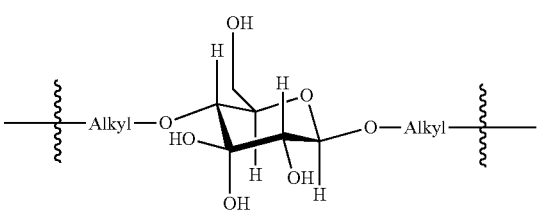

,

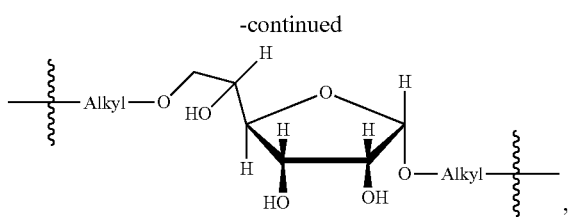
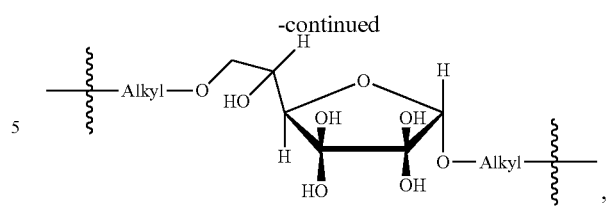
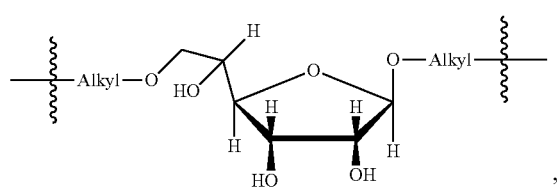
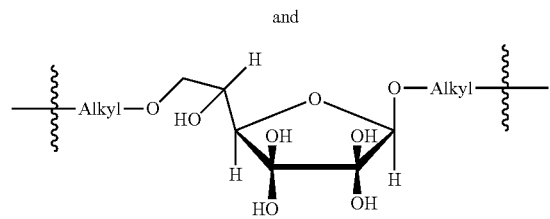
9. A material comprising a compound from the group consisting of formulas (V), (VI), (VII), (VIII), and salts thereof:
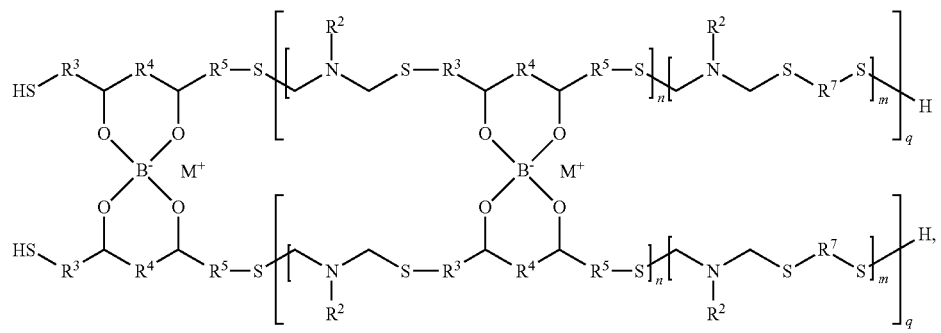
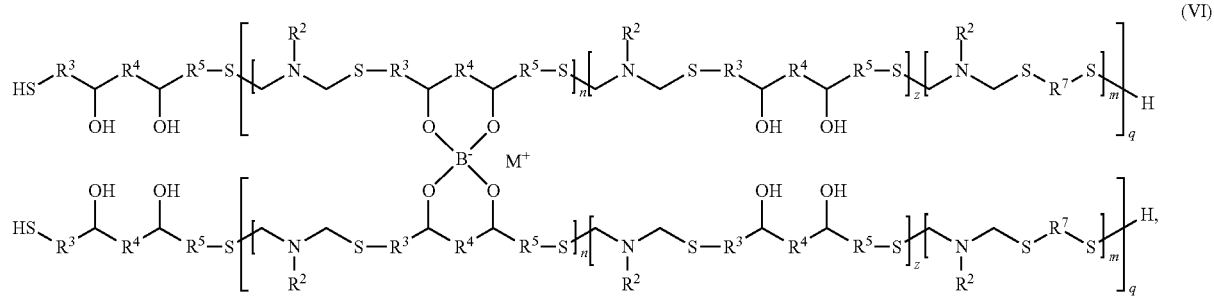

-continued

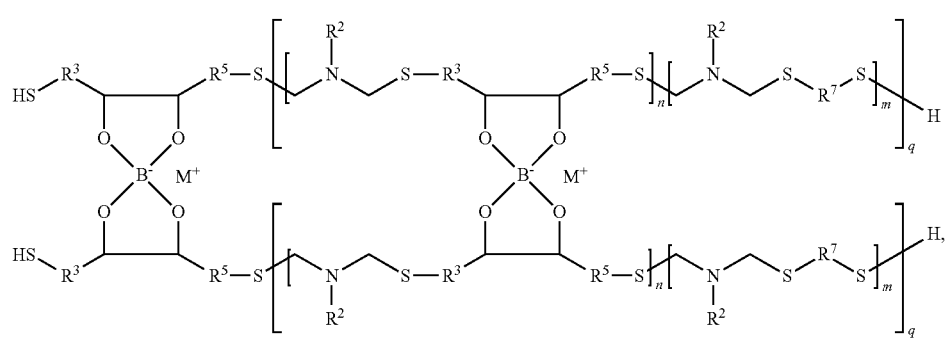

(VII)

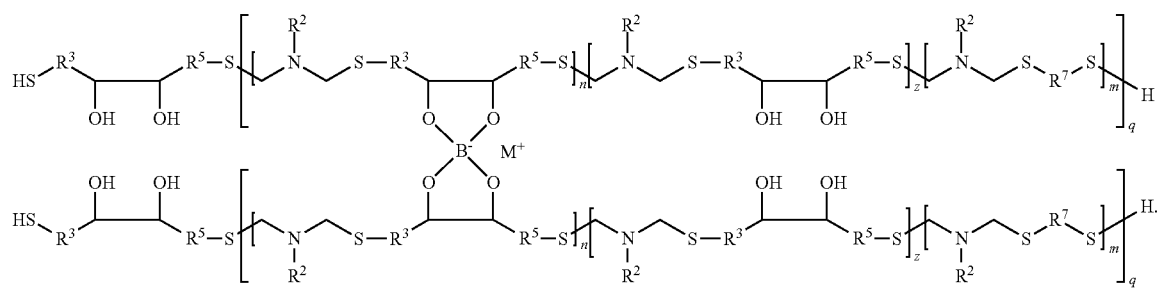

(VIII)

wherein:
each instance of $R^2$ is independently selected from the group consisting of hydrogen, halo, aryl, alkoxyl, cycloalkyl, heterocyclyl, —$NH_2$, and substituted or unsubstituted alkyl;
each instance of $R^3$ and $R^5$ is independently selected from the group consisting of substituted or unsubstituted alkyl, aryl, cycloalkyl, or heterocyclyl or $R^3$ and $R^5$ combine to form a 5- or 6-membered cycloalkyl or heterocyclyl;
each instance of $R^4$ is independently a substituted or unsubstituted methylene;
each instance of $R^7$ is independently selected from the group consisting of substituted or unsubstituted alkyl, aryl, cycloalkyl, heterocyclyl, polyether, and mixtures thereof;
$M^+$ is a cation; and
n, m, and q is each a positive integer and the number average molecular weight or weight average molecular weight of the polythioaminals of each of formulas (I), (II), (III), and (IV) is between about 2,000 to about 160,000.

10. The material of claim 9, wherein the polyether is a glycol.

11. The material of claim 10, wherein the glycol is polyethylene glycol or polypropylene glycol.

12. The material of claim 9, wherein $R^7$ is substituted with at least one substituent selected from the group consisting of alkyl, aryl, alkoxyl, halo, cycloalkyl, and heterocyclyl.

13. The material of claim 9, wherein each instance of M+ is independently selected from the group consisting of $Na^+$, $K^+$, $Li^+$, $Mg^{2+}$, and $Ca^{2+}$.

14. The material of claim 9, wherein at least one of $R^3$ and $R^5$ is substituted with one or more of alkyl, hydroxyl, aryl, alkoxyl, halo, cycloalkyl, or heterocyclyl.

15. The material of claim 9, wherein the compound is selected from the group consisting of:

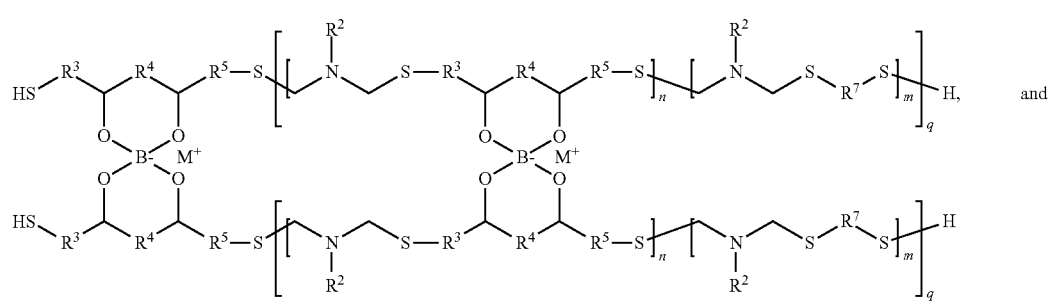

(V)

and

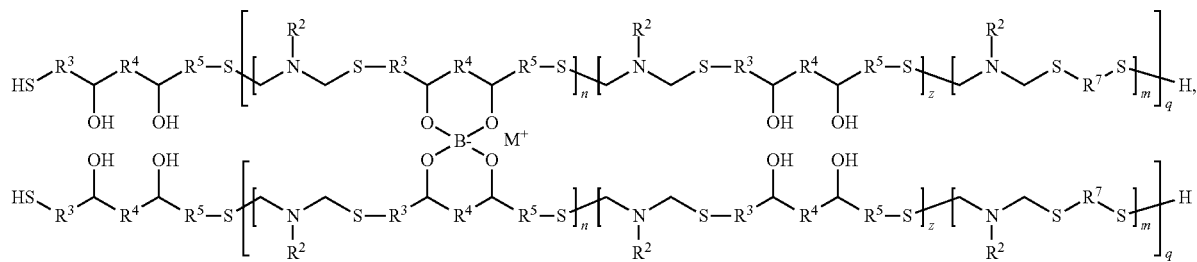

wherein R⁴ is substituted with one or more of alkyl, aryl, alkoxyl, halo, cycloalkyl, or heterocyclyl.

16. The material of claim 9, wherein R² is substituted with one or more of alkyl, aryl, alkoxyl, halo, cycloalkyl, heterocyclyl, or —NH₂.

17. The material of claim 9, wherein the number average molecular weight or weight average molecular weight of the compounds of each of formulas (I), (II), (III), and (IV) is between about 15,000 to about 40,000.

18. The material of claim 9, wherein R³ and R⁵ combine to form a hydroxyl substituted 5- or 6-membered heterocyclyl.

19. The material of claim 18, wherein the hydroxyl substituted 5- or 6-membered heterocyclyl is selected from the group consisting of:

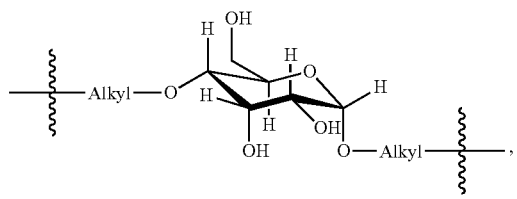

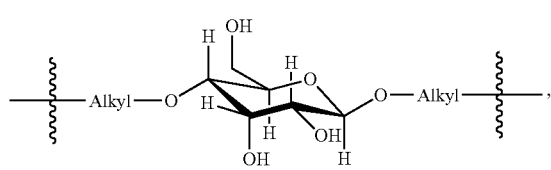

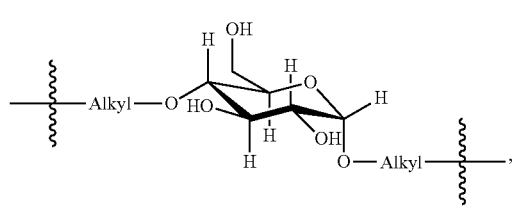

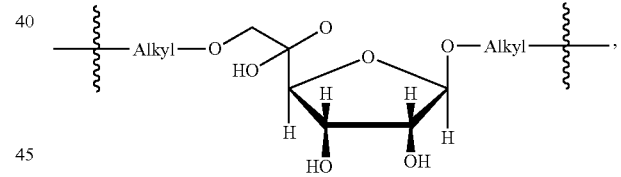

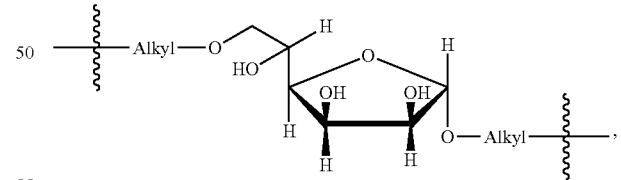

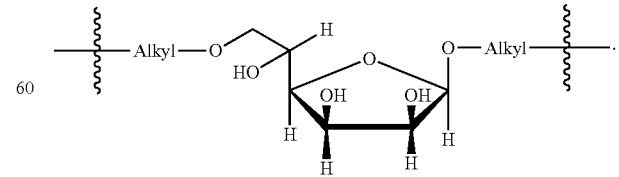

and

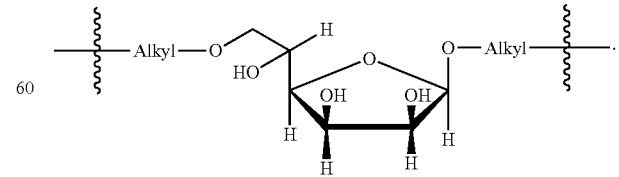

20. The material of claim 18, wherein the compound is of formula (IX):

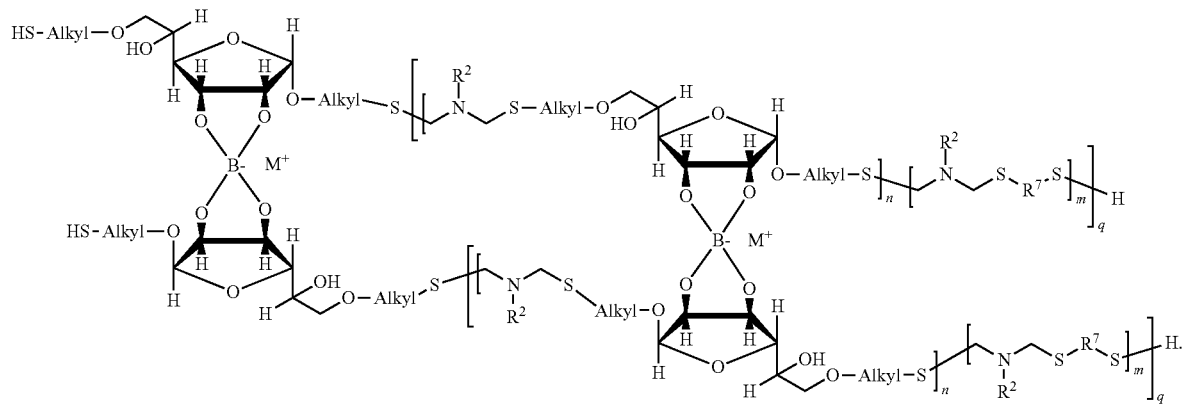
(IX)
* * * * *